United States Patent [19]

Takekoshi et al.

[11] Patent Number: 5,707,439
[45] Date of Patent: Jan. 13, 1998

[54] LAYERED MINERALS AND COMPOSITIONS COMPRISING THE SAME

[75] Inventors: Tohru Takekoshi, Scotia; Farid Fouad Khouri, Clifton Park; John Robert Campbell, Clifton Park; Therese Coste Jordan, Clifton Park; Kevin Hsingtao Dai, Clifton Park, all of N.Y.

[73] Assignee: General Electric Company, Schenectady, N.Y.

[21] Appl. No.: 574,012

[22] Filed: Dec. 18, 1995

Related U.S. Application Data

[62] Division of Ser. No. 416,112, Apr. 3, 1995, Pat. No. 5,530,052.

[51] Int. Cl.$^6$ .............................. C04B 14/04; C04B 14/00
[52] U.S. Cl. .................. 106/483; 106/415; 106/416; 106/417; 106/482; 106/486; 106/487; 106/491; 428/688; 501/148
[58] Field of Search ................................ 106/415, 416, 106/417, 486, 487, 482, 483, 491; 428/688; 501/148

[56] References Cited

U.S. PATENT DOCUMENTS

| | | | |
|---|---|---|---|
| 4,695,402 | 9/1987 | Finlayson et al. | 106/487 |
| 5,075,033 | 12/1991 | Cody et al. | 106/487 |
| 5,106,421 | 4/1992 | Marshall, Jr. et al. | 106/487 |
| 5,137,568 | 8/1992 | Durham et al. | 106/487 |
| 5,294,254 | 3/1994 | Dessauer et al. | 106/486 |
| 5,298,064 | 3/1994 | Dessauer et al. | 106/287.34 |

*Primary Examiner*—Anthony Green
*Attorney, Agent, or Firm*—William H. Pittman

[57] ABSTRACT

Novel silicate minerals that have undergone a cation exhange with at least one heteroaromatic cation comprising a positively charged organo-substituted heteroatom and/or at least one positively charged heteroatom not part of an aromatic ring with at least one bond having a bond order greater than one and compositions comprising the same are described.

13 Claims, No Drawings

LAYERED MINERALS AND COMPOSITIONS COMPRISING THE SAME

This application is a division, of application Ser. No. 08/416,112, filed Apr. 3, 1995, U.S. Pat. No. 5,530,052.

FIELD OF THE INVENTION

This invention relates to novel silicate minerals as well as compositions comprising the same. More particularly, the instant invention relates to layered minerals that have undergone a cation exchange with at least one heteroaromatic cation comprising a positively charged organo-substituted heteroatom and/or at least one positively charged heteroatom not part of an aromatic ring with at least one bond having a bond order greater than one.

BACKGROUND OF THE INVENTION

Compositions comprising polycarbonates, polyesters and polyphenylene ethers, for instance, constitute invaluable classes of engineering thermoplastics. They are characterized by a unique combination of chemical, physical and electrical properties. For example, they are chemically stable and generally display high impact strengths.

It is of increasing interest to prepare polymer compositions that, while retaining their characteristic properties, have higher heat deflection temperatures. Particularly, there is demand for polycarbonate, polyester and polyphenylene ether compositions which possess increased heat deflection temperatures since they are, for instance, conventionally used in commercial applications often exposed to elevated temperatures. Moreover, fillers, for example, have been added to polymer compositions in an attempt to improve properties.

The instant invention therefore is based on the discovery of novel layered minerals which may be employed as components of compositions and novel compositions prepared from low viscosity macrocyclic oligomers.

DESCRIPTION OF THE PRIOR ART

Efforts have been disclosed for preparing polymeric nanocomposites. In International Application WO 94/11430, nanocomposites having two essential components are described and the two essential components are gamma phase polyamides and layered and fibrillar inorganic materials which are treated with quaternary ammonium cations.

Still other efforts have been made to prepare composite materials containing a layered silicate. In U.S. Pat. No. 4,889,885, a composite material having high mechanical strength and heat resistance which is suitable for use in automotive parts, aircraft parts and building materials is described.

The instant invention is patentably distinguishable from the above-described since, among other reasons, it is directed to novel layered minerals that have undergone a cation exchange with at least one heteroaromatic cation comprising a positively charged organo-substituted heteroatom and/or a positively charged heteroatom not part of an aromatic ring with at least one bond having a bond order greater than one, and compositions prepared therefrom. Additionally, the instant invention is directed to novel compositions prepared from low viscosity macrocyclic oligomers.

SUMMARY OF THE INVENTION

In a first aspect, this invention is directed to novel layered minerals that have undergone a cation exchange with at least one member selected from the group consisting of:

(a) a heteroaromatic cation comprising at least one positively charged organo-substituted heteroatom; and (b) a cation comprising at least one positively charged heteroatom not part of an aromatic ring with at least one bond having a bond order greater than one.

In a second aspect, the instant invention is directed to compositions which comprise at least one organic system, either macrocyclic and/or linear and/or branched polymer, and the aforementioned layered minerals having undergone a cation exchange with at least one of the cations described in (a) and (b).

In a third aspect, the instant invention is directed to compositions which comprise macrocyclic oligomers and layered minerals that have undergone a cation exchange with onium compounds.

In a fourth aspect, the instant invention is directed to a process for producing polymers by polymerizing macrocyclic oligomers in the presence of layered minerals.

In a fifth aspect, the instant invention is directed to the polymerization product of the macrocyclic oligomer compositions.

It is often preferred that the compositions described herein comprise the layered minerals that have undergone a cation exchange with the cations described in (a) and (b) since such compositions unexpectedly display an improvement in their rigidity as depicted by an increase in their elastic modulus and/or an improvement in their stability as depicted by their molecular weights. Moreover, subsequent to blending polymer and layered minerals the compositions may be referred to as nanocomposites which are defined herein as a composition having an organic system and a layered mineral (clay) component dispersed therein and the layered mineral has at least one dimension which is nanometer scale in size.

DETAILED DESCRIPTION OF THE PREFERRED EMBODIMENTS

There is no limitation with respect to the layered minerals employed in this invention other than that they are capable of undergoing a cation exchange with the cations and/or onium compounds mentioned above. Illustrative of such layered minerals that may be employed in this invention include, for instance, those of the kaolinite group and the montmorillonite group. The former group can include kaolinite, halloysite, dickite, nacrite and the like. The latter group can include montmorillonite, nontronite, beidellite, hectorite, saponite and the like.

It is also within the scope of the invention to employ minerals of the illite group which can include hydromicas, phengite, brammallite, glaucomite, celadonite and the like. Moreover, layered minerals including kenyaite, magadite, muscovite, sauconite, vermiculite, volkonskoite as well as any minerals classified as phyrophyllics, micas or smectites may be employed in this invention; again, with the proviso that they are capable of cation exchanging as mentioned above.

Still further, it is within the scope of the instant invention to include layered minerals which are classified as layered double hydroxides as well as layered minerals having little or no charge on their layers provided that they are capable of expanding when contacted with the cations and onium compounds mentioned above.

Often, however, the preferred layered minerals include those often referred to as 2:1 layered silicate minerals like muscovite, vermiculite, beidelite, saponite, hectorite and montmorillonite, wherein mortmorillonite is often preferred.

In addition to the clays mentioned above, admixtures prepared therefrom may also be employed as well as accessory minerals including, for instance, quartz, biotite, limonite, hydrous micas, feldspar and the like.

The layered minerals described above may be synthetically produced. However, most often they are naturally occurring and commercially available. They are typically prepared via a number of methods which include the hydrolysis and hydration of silicates, shale weathering as well as the action of acid clays, humus and inorganic acids on primary silicates.

Cation, as used herein, is defined, for instance, as being positively charged compounds derived from heteroaliphatic, heteroalicyclic or substituted or unsubstituted heteroaromatic compounds, including monocyclic, bicyclic, tricyclic and polycyclic compounds.

There is no limitation in this invention with respect to the heteroaromatic cations comprising at least one positively charged organo-substituted heteroatom or the cations comprising at least one positively charged heteroatom not part of an aromatic ring with at least one bond having a bond order greater than one. Bond order greater than one is defined herein as any bond greater than a single bond including partial double bonds and double bonds. The only proviso is that they are capable of undergoing a cation exchange with the layered minerals employed in this invention.

The heteroaromatic cations employed in this invention may be substituted or unsubstituted on atoms aside from the organo-substituted heteroatoms, and they can contain more than one heteroatom. Therefore, it is within the scope of the instant invention to include cations derived from, for instance, $C_{3-14}$ aromatics including benzene, naphthalene, anthracene or phenanthrene and the like and "derived from" as used throughout is meant to mean that at least one skeletal carbon atom is replaced with at least one heteroatom.

The latter cations comprising at least one positively charged atom with at least one bond having a bond order greater than one include, for instance, imines (Schiff bases) and any injure cations derived therefrom such as aza, thia, phospha and oxa containing cations. Therefore, the heteroaromatic cations comprising at least one positively charged organo-substituted heteroatom and the cations comprising at least one positively charged atom not part of an aromatic ring with at least one bond having a bond order greater than one can be referred to herein as inium-type cations since they are trigonally planar in nature and distinguishable from onium-type cations which are tetrahedral in nature.

There is no limitation with respect to the heteroatom employed in this invention and they are often selected from the group consisting of N, P, O and S and preferably N.

Often preferred heteroaromatic cations that comprise at least one positively charged organo-substituted heteroatom employed in this invention include, for example, N-organo-substituted salts of pyrrole, imidazole, thiazole, oxazole, pyridine, pyrimidine, quinoline, isoquinoline, indole, purine, benzimidazole, benzothiazole, benzoxazole, pyrazine, quinoxaline, quinazoline, acridine, phenazine, imidazopyridine, dipyridyl and the like.

The organo-substituent on the organo-substituted heteroatom is often a $C_{1-25}$ aliphatic, alicyclic or aromatic group and preferably a $C_{1-18}$ group, and the often most preferred cations are $N$-$C_{10-18}$ pyridinium cations. An illustrative list includes, for instance, N-dodecylpyddinium cations, N,N'-ditetradecylbenzimidazolinium cations and 4-(dialkylamino)-N-alkylpyridinium cations like 4-(dibutylamino)-N-butylpyridinium cations and the like.

The cations comprising at least one heteroatom with at least one bond having a bond order greater than one often include, for example, those having the formula

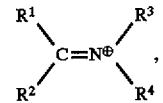   I wherein $R^1$, $R^2$, $R^3$ and $R^4$ are each independently a hydrogen, $C_{1-20}$ alkyl group, aromatic radical, substituted heteroatom or

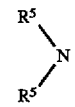

and $R^5$ is hydrogen or a $C_{1-10}$ alkyl group, or at least one of $R^1$ and $R^2$, $R^3$ and $R^4$, $R^1$ and $R^3$ and $R^2$ and $R^4$ taken together with the atoms connecting them can form a 4 to 10 membered cyclic or bicyclic ring. Often preferred cations employed in this invention include salts of guanidines and amidines; therefore, guanadinium and amidinium type cations. Illustrative examples include hexaalkylguanidinium salts like N,N,N',N",N"-hexabutylguanidinium cations as well as those described in U.S. Pat. No. 5,132,423, the disclosure of which is incorporated herein by reference.

Other cations which comprise a least one heteroatom with at least one bond having a bond order greater than one include, lot instance, those derived from $C_{1-14}$ heteroalicycloalkenes like bicyclododecene, bicyclononene, bicycloundecene, tricyclotetradecene and the like as well as those that may be derived from bicyclo and spirobicyclo compounds.

When compositions are prepared with macrocyclic oligomers, layered minerals having undergone a cation exchange with onium type compounds may be employed. Such onium type compounds include ammonium, phosphonium and sulfonium type salts such as those having the formula

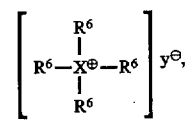   II wherein each $R^6$ is independently a hydrogen, $C_{1-20}$ alkyl group or substituted or unsubstituted aromatic radical or two $R^6$s together with atoms connecting them can form a 4 to 12 membered cyclic or bicyclic ring and X is N, P or S and y is an anion and often Cl or Br. It is also within the scope of the instant invention for at least one $R^6$ to comprise reactive functionalized groups such as unsaturated carbon groups, carbonyl groups including carboxylic acid derivatives and nitrogen containing derivatives such as amines and the like as well as epoxy groups, orthoester groups and the like.

Other onium type cations which may be employed include, for example, salts of pyrrolidine, piperidine, piperazine and morpholine as well as heterocations derived from bicyclododecane, bicyclononane, bicycloundecane, tricycloundecane and the like.

The compositions of this invention comprising layered minerals having undergone a cation exchange with at least one heteroaromatic cation comprising a positively charged organo-substituted heteroatom and/or at least one positively charged heteroatom not part of an aromatic ring with at least one bond having a bond order greater than one also comprise organic systems which are defined as any polymers or oligomers capable of being combined with the layered minerals. Often such organic systems include macrocyclic oligomers as well as linear and branched polymers. There is no limitation with respect to the organic systems employed in this invention and they are commercially known and conventionally produced. They can often comprise those selected from the group consisting of linear and branched polymers of polycarbonates, polyesters, polyphenylene ethers, polyimides, olefins, polyetherimides, polyamides, polyarylene sulfides, polysulfones, polyetherketones, acrylonitrile butadiene styrene copolymers, polystyrenes and blends, compositions or copolymers prepared therefrom.

Still further, the organic systems employed in this invention may often comprise macrocyclic oligomers selected from the group consisting of macrocyclic polycarbonates, polyesters, polyimides, polyetherimides, polyphenylene ether-polycarbonate co-oligomers, polyetherimide-polycarbonate co-oligomers and blends, compositions and co-oligomers prepared therefrom. Moreover, organic systems comprising polyesters, polycarbonates or polyphenylene ethers are often preferred. Such organic systems typically include, for example, polyesters like poly(1,2-ethylene terephthalate), poly(1,4-butylene terephthalate), poly(1,2-ethylene 2,6-naphthalenedicarboxylate) and the like and co-polymers thereof and polycarbonates like bisphenol A polycarbonate and the like and polyphenylene ethers including homopolymers containing 2,6-dimethyl-1,4-phenylene ether units or 2,3,6-trimethyl-1,4-phenylene ether units as well as copolymers thereof. It is also noted herein that all of the organic systems may be unfunctionalized or functionalized by any of the well known methods described in the art including acid, anhydride and orthoester type functionalizations common in the art.

The layered minerals of the instant invention typically possess negatively charged layers having intercalated inorganic alkali and/or alkaline earth cations present therein. The result of such is a strong electrostatic interaction between the charged layers and the cations, rendering the layered minerals often difficult to disperse in non-polar organic systems. In the instant invention, the layered minerals are prepared, for instance, by subjecting them to the cations comprising a positively charged organo-substituted heteroatom and/or at least one positively charged heteroatom not part of an aromatic ring with at least one bond having a bond order greater than one in a homogeneous dispersion usually comprising water and a water miscible organic solvent including alcohols and ketones. Such preparation renders the layered minerals less difficult to disperse in non-polar organic systems.

Compositions comprising the layered minerals may be prepared, for example, by melt blending/extruding the layered minerals with polymer or mixing the layered minerals in low viscosity macrocyclic oligomers prior to polymerizing, wherein low viscosity is defined as being less than about 2,000 centipoise. When the layered minerals are mixed in a low viscosity macrocyclic oligomer, polymer is subsequently formed usually by adding an appropriate catalyst such as, for example, a zinc, titanium or tin containing polymerization catalyst. Moreover, the compositions comprising the layered minerals in the instant invention are often no more than about 70% by weight and preferably no more than about 40% by weight and most preferably no more than about 20% by weight layered mineral based on total weight of the composition.

The following examples further illustrate and facilitate the understanding of the instant invention. The products obtained may be confirmed by conventional techniques such as proton and carbon 13 nuclear magnetic resonance spectroscopy and GPC analysis.

EXAMPLE 1

A mixing blender was charged with 500 mL of water, 200 mL of methanol and 11 g of sodium montmorillonite (10% $H_2O$ 119 meq/100 g) which was added in portions to produce a homogeneous dispersion. The homogeneous dispersion was vigorously stirred and a solution of dodecylammonium chloride consisting of 4.85 g (26.2 mmol) of the amine, 2.64 g of 37% aqueous HCl, 25 mL of $H_2O$ and 25 mL of methanol, was added all at once to the dispersion. A white precipitate was produced and recovered by filtration and subsequently washed with water. The resulting washed precipitate was re-dispersed in 700 mL of $H_2O$. The resulting washed precipitate (montmorillonite having undergone a cation exchange with an ammonium cation) was recovered (12.12 g) by filtration and freeze-dried under vacuum.

EXAMPLE 2

In Example 2, layered mineral was prepared in a manner similar to the one described in Example 1 except that N-hexadecylpyridinium chloride was employed in lieu of dodecylammonium chloride. Recovered was montmorillonite having undergone a cation exchange with a cation comprising a positively charged organo-substituted heteroatom.

EXAMPLES 3 AND 4

Macrocyclic oligomer compositions were prepared by charging two mixing flasks, both with 4.8 g macrocyclic oligomer (cyclic terephthalate co-oligomer 5:95 mixture of ethylene and butylene glycols, based on total weight of the co-oligomer)) and one (Example 3) with montmorillonite (0.20 g) having undergone a cation exchange as described in Example 1 and the other (Example 4) with montmorillonite (0.20 g) having undergone a cation exchange as described in Example 2. The resulting mixtures were flushed with nitrogen and then dried under a vacuum of 0.05 torr at 110° C. for 0.5 hour. The flasks were then placed in an oil bath maintained at 190° C. to melt the mixtures under vacuum. The resultant low viscosity translucent liquids were stirred for 15 minutes at 190° C. to produce macrocyclic oligomer melt compositions. Subsequent to cooling, the compositions solidified having layered minerals homogeneously dispersed therein.

EXAMPLE 5

A polymerization catalyst, dioctyltin dioctoxide (62 μl, 0.109 mmol) was added at 190° C. to a macrocyclic oligomer melt 5 composition as prepared in Example 4, to polymerize the oligomers. The melt became viscous in about 15 seconds and the resulting solid polymer composition comprising montmorillonite having undergone cation exchange formed in about 2 minutes. The weight average molecular weight (Mw) determined by gel permeation chromatography (GPC) of the polymerized composition obtained was 103,000.

EXAMPLE 6

A composition was prepared in a manner similar to the one described in Example 5 except that a cyclic butylene terephthalate homo-oligomer was employed in lieu of cyclic terephthalate co-oligomer composed of 5:95 mixture of ethylene and butylene glycols, and dioctyl 2,2-diethyl-1,3-propylenedioxytitanate was employed as a polymerization catalyst in lieu of dioctyltin dioctoxide. The weight average molecular weight of the polymerized composition obtained was 145,000.

EXAMPLE 7

The composition in this example was prepared in a manner similar to the one described in Example 6 except that montmorillonite as prepared in Example 2 was employed in lieu of montmorillonite as prepared in Example 1 and tetraoctyl titanate, a polymerization catalyst was used in lieu of dioctyl 2,2-diethyl-1,3-propylenedioxytitanate. The weight average molecular weight was 139,000.

EXAMPLE 8

A well mixed dry blend of polyphenylene ether (homopolymer containing 2,6-dimethyl-1,4-phenylene ether units) (20 parts) and montmorillonite as prepared in Example 2 (1 part) was extruded using a twin screw extruder operating at 295° C. and 400 rpm with a feed rate of approximately 40 g/minute. The extrudate was pelletized, dried at 90° C. in a vacuum oven and test specimens were injection molded on a 15 ton injection molder at 310° C. The compositions exhibited a shear modulus of $13.9 \times 10^9$ dyne/$cm^2$ at room temperature which is a 29% increase over the compositions produced using unmodified montmorillonite. Compositions produced using an onium salt modified montmorillonite resulted in only 15% improvement in modulus.

EXAMPLE 9

The composition in this example was prepared in a manner similar to the one described in Example 8 except that poly(1,4-butylene terephthalate) powder was employed in lieu of polyphenylene ether and the extruder temperature was about 260° C. The resulting extrudate was pelletized, dried in an air circulating oven at 120° C. for 4 hours and molded on a 30 ton injection molding machine. The composition had a weight average molecular weight of $97.2 \times 10^3$ whereas compositions prepared by using dodecylammonium cation modified layered minerals had a weight average molecular weight of $84.6 \times 10^3$.

The data in the tables below is provided to demonstrate the unexpected and superior properties obtained in the instant invention. All entries have been prepared in a manner similar to those described in the examples.

TABLE I

| Entry | Organic System[a] | Layered mineral[b] | Cation[c] | T °C. | Shear Modulus[d] |
|---|---|---|---|---|---|
| 1 | PBT | None | None | 60 | 4.59 |
|   |     |      |      | 150 | 0.86 |
|   |     |      |      | 200 | 0.51 |
| 2 | PBT | M    | Na+  | 60  | 5.74 |
|   |     |      |      | 150 | 1.13 |
|   |     |      |      | 200 | 0.666 |
| 3 | PBT | m    | Na+  | 60  | 7.88 |
|   |     |      |      | 200 | 0.87 |
| 4 | c-PBT | M' | DDA | 60 | 6.80 |
|   |     |      |      | 150 | 1.79 |
|   |     |      |      | 200 | 0.82 |
| 5 | PBT | M    | DDA  | 60  | 9.04 |
| 6 | PBT | m    | DDA  | 60  | 15.6 |
| 7 | PBT | M    | DDA  | 200 | 0.88 |
| 8 | PBT | m    | DDA  | 200 | 1.38 |
| 9 | PBT | M    | HDA  | 60  | 9.8 |

TABLE I-continued

| Entry | Organic System[a] | Layered mineral[b] | Cation[c] | T °C. | Shear Modulus[d] |
|---|---|---|---|---|---|
|    |     |      |      | 200 | 0.97 |
| 10 | PBT | M    | HDP  | 60  | 8.27 |
|    |     |      |      | 200 | 0.85 |
| 11 | PPE | None | None | 25  | 10.2 |
| 12 | PPE | M    | Na+  | 25  | 10.8 |
| 13 | PPE | M    | HDA  | 25  | 12.4 |
| 14 | PPE | M    | HDP  | 25  | 13.9 |

[a]PBT = poly(1,4-butylene terephthalate); c-PBT = in situ polymer from ring-opening polymerization of macrocyclic butylene terephthalate oligomers; PPE = polyphenylene ether.
[b]M = montmorillonite, 5% of the total weight of the organic system.
m = montmorillonite, 15% of the total weight of the organic system;
M' = 4% of the total weight of the organic system.
[c]Na+ = control; DDA = dodecylammonium cation; HDA = hexadecylammonium cation; HDP = N-hexadecylpyridinium cation.
[d]($10^9$ dyne/$cm^2$).

TABLE II

| Entry | Organic System[e] | Layered mineral[f] | Cation[g] | MW[h] |
|---|---|---|---|---|
| 1  | PPE | None | None | 74.0 |
| 2  | PPE | M    | Na+  | 72.9 |
| 3  | PPE | M    | DDA  | 61.9 |
| 4  | PPE | M    | TDA  | 67.6 |
| 5  | PPE | M    | HDA  | 62.2 |
| 6  | PPE | M    | TDP  | 65.2 |
| 7  | PPE | M    | HDP  | 67.0 |
| 8  | PBT | None | None | 104.0 |
| 9  | PBT | M    | Na+  | 94.9 |
| 10 | PBT | m    | Na+  | 92.9 |
| 11 | PBT | M    | DDA  | 84.6 |
| 12 | PBT | m    | DDA  | 74.3 |
| 13 | PBT | M    | HDP  | 97.2 |

[e]As defined in Table I.
[f]As defined in Table I.
[g]As defined in Table I and TDP = N-tetradecylpyridinium; Na+ = control.
[h]Weight average molecular weight $\times 10^{-3}$.

What is claimed is:

1. A layered mineral having undergone a cation exchange with at least one member selected from the group consisting of:
   (a) a heteroaromatic cation comprising at least one positively charged organo-substituted heteroatom; and
   (b) a cation comprising at least one positively charged heteroatom not part of an aromatic ring with at least one bond having a bond order greater than one.

2. A layered mineral in accordance with claim 1 wherein said layered mineral is from a kaolinite group, montmorillonite group, illite group or a combination thereof.

3. A layered mineral in accordance with claim 2 wherein said kaolinite group comprises kaolinite, halloysite, dickite or nacrite.

4. A layered mineral in accordance with claim 2 wherein said montmorillonite group comprises montmorillonite, nontronite, beidellite, hectorite or saponite.

5. A layered mineral in accordance with claim 2 wherein said illite group comprises hydromicas, phengite, brammallite, glaucomite or celadonite.

6. A layered mineral in accordance with claim 1 wherein said layered mineral is kenyaite, magadite, muscovite, sauconite, vermiculite, volkonskoite, phyrophyllics, mica or smectite.

7. A layered mineral in accordance with claim 1 wherein said cation in (a) and said cation in (b) comprise a heteroatom selected from the group consisting of N, P, O and S.

8. A layered mineral in accordance with claim 7 wherein said heteroaromatic cation comprising at least one positively charged organo-substituted heteroatom is an organo-substituted salt of pyrrole, imidazole, thiazole, oxazole, pyridine, pyrimidine, quinoline, isoquinoline, indole, purine, benzimidazole, benzothiazole, benzoxazole, pyrazine, quinoxaline, quinazoline, acridine, phenazine, imidazopyridine or dipyridyl.

9. A layered mineral in accordance with claim 8 wherein said organo-substituted heteroatom is substituted with a $C_{1-25}$ aliphatic, alicyclic or aromatic group.

10. A layered mineral in accordance with claim 9 wherein said heteroaromatic cations are N-$C_{1-18}$ pyridinium cations.

11. A layered mineral in accordance with claim 1 wherein said cation comprising at least one positively charged heteroatom not part of an aromatic ring with at least one bond having a bond order greater than one has the formula

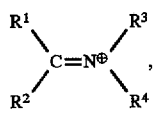

wherein $R^1$, $R^2$, $R^3$ and $R^4$ are each independently a hydrogen, $C_{1-20}$ alkyl group, aromatic radical, substituted heteroatom or

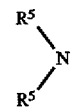

and $R^5$ is hydrogen or a $C_{1-10}$ alkyl group, or at least one of $R^1$ and $R^2$, $R^3$ and $R^4$, $R^1$ and $R^3$ and $R^2$ and $R^4$ taken together with the atoms connecting them form a 4 to 10 membered cyclic or bicyclic ring.

12. A layered mineral in accordance with claim 11 wherein said cations comprising at least one positively charged heteroatom not part of an aromatic ring are salts of guanidines or amidines.

13. A layered mineral in accordance with claim 12 wherein said salts of guanidines are hexaalkylguanidinium salts.

* * * * *

UNITED STATES PATENT AND TRADEMARK OFFICE
CERTIFICATE OF CORRECTION

PATENT NO. : 5,707,439

DATED : January 13, 1998

INVENTOR(S) : Tohru Takekoshi et al.

It is certified that error appears in the above-identified patent and that said Letters Patent is hereby corrected as shown below:

On the title page, after "Inventors: Tohru Takekoshi, Scotia; Farid Fouad Khouri, Clifton Park;" delete --John Robert Campbell, Clifton Park; Therese Coste Jordan, Clifton Park; Kevin Hsingtao Dai, Clifton Park, and change "all" to --both--.

Signed and Sealed this

Thirty-first Day of March, 1998

Attest:

BRUCE LEHMAN

Attesting Officer

Commissioner of Patents and Trademarks